United States Patent [19]

Conner, Jr.

[11] Patent Number: 5,228,549
[45] Date of Patent: Jul. 20, 1993

[54] MOBILE BELTINE MOVING SYSTEM

[76] Inventor: Robert B. Conner, Jr., P.O. Box 751, Prestonburg, Ky. 41653

[21] Appl. No.: 939,700

[22] Filed: Sep. 2, 1992

[51] Int. Cl.$^5$ .............................................. B65G 00/00
[52] U.S. Cl. .................... 198/303; 198/812; 198/861.2
[58] Field of Search ............... 198/302, 303, 594, 812, 198/861.2; 299/18, 56, 64, 67

[56] References Cited

U.S. PATENT DOCUMENTS

| | | | |
|---|---|---|---|
| 1,920,500 | 8/1933 | Garcia et al. | 198/861.2 |
| 1,925,014 | 8/1933 | Thomson | 198/812 |
| 2,733,806 | 2/1956 | Lanier, Jr. | 198/139 |
| 2,992,723 | 7/1961 | Poundstone | 198/139 |
| 3,204,755 | 9/1965 | Caine | 198/139 |
| 3,268,060 | 8/1966 | Long | 198/812 |
| 4,195,726 | 4/1980 | Denny et al. | 198/812 |
| 4,784,257 | 11/1988 | Doerr | 198/594 |
| 4,860,878 | 8/1989 | Mraz et al. | 198/861.2 |
| 4,896,764 | 1/1990 | Neunzert | 198/861.2 |
| 4,986,412 | 1/1991 | Brais | 198/592 |

Primary Examiner—Joseph E. Valenza
Attorney, Agent, or Firm—Griffin, Butler, Whisenhunt & Kurtossy

[57] ABSTRACT

A mobile and elevatable train is used in an underground mine to extend, or shorten, a roof-mounted conveyor system. A train is comprised of a plurality of cars, each of which has independent jacks adapted to raise, or lower, each car with respect to the roof. The plurality of cars is linked together by a mechanism which allows the cars to travel together, yet allows them to pivot with respect to another and also assume different elevations with respect to another. Each one of the plurality of cars carries at least one detachable roller structure which is elevated to the position it should have in the conveyor system, after the roof supports have been attached. Each car may also carry at least one permanently attached roller structure so that the mobile and elevatable train can temporary function as the support for a moving conveyor belt, prior to its next move. The mobile and elevatable train is equally adapted to either an advancing, or retreating, belt line.

15 Claims, 5 Drawing Sheets

5,228,549

MOBILE BELTINE MOVING SYSTEM

FIELD OF THE INVENTION

This invention relates to conveyor systems used in underground mines; more particularly, the invention relates to conveyor systems suspended from the roof of a mine shaft and a method and system of "moving", or adjusting the length of, a conveyor beltline as the face of the mine either advances or retreats.

BACKGROUND AND OBJECTS OF THE INVENTION

The underground mining of a material like, coal, for example, inevitably involves a conveyor system to move the materials removed from the face of a mine to the exit of the mine for further use and processing. As mining "advances" and the face of the mine moves with respect to the more or less permanently installed conveyor belt system, adjustments may have to be made to either lengthen, or shorten, the conveying system so that it is as close as possible to the moving face——whether advancing, or retreating.

Particularly where the conveyor system is suspended from the roof, as opposed to the floor, of a mineshaft, the prior art has been limited to essentially manual efforts required to drive new, or remove old, roof support means to lengthen, or shorten, the conveyor system. Traditionally, manual labor has been used to instal the roof support system for both the top, load carrying, rollers and the corresponding bottom, return rollers.

The installation of top rollers depending from the roof support means has, in the prior art, involved the manual lifting of typical top roller structures, which, may weigh up to 65 pounds a piece. The heavy manual labor required, together with the relatively slow pace thereof, has lead to extended shut-down of production with its consequent inefficiencies. Whether lengthening of a conveyor system by installing additional supports, or shortening the system by removing supports, the end result is still extended periods of mine shut-down, since no lengthening, or shortening, of a conveyor system can be attempted while the conveyor system is moving.

Accordingly, it is a primary object of the invention to provide a new and improved conveyor system and method for altering the length of the conveyor system.

It is another object of the invention to provide a method and system for altering the length of a conveyor system involving far less intensive manual work and more quickly performable, to thereby minimize mine shut-down time.

SUMMARY OF THE INVENTION

In accordance with one aspect of the invention, the essential pieces involving, for example, a lengthening of a roof suspended underground conveyor system involves the use of a mobile train, comprised of a plurality of cars, on which are carried the essential components of a conveyor system. After a belt has been cut in preparation for a move, the mobile train carries the essential structural components of a conveyor system to the new location where, once arrived, the mobile train, and the plurality of cars therein, can be individually, or collectively, elevated to a position where the new suspension and roller structures are to be positioned. After the necessary suspension pieces and roller structures have been assembled to depend from the roof of the mineshaft, the mobile train may remain at raised elevation and itself function as part of the conveyor system, once the belts have been spliced, to restart the mining operation. In such case, the mobile train, and the plurality of cars therein, are preferably equipped with permanent roller structures as a part thereof, while also functioning, of course, as carriers for detachable rollers, which are eventually to be affixed to the suspension system.

Each car of the mobile train is equipped with means to change its elevation, for example, hydraulic jacks, preferably two for each car so that side-to-side adjustments in elevation of the car can be used to properly "train" the belt, so that it does not "ride" toward one, or the other, side of the roller system but stays generally centered.

In accordance with yet another aspect of the invention, each of the cars is equipped with means allowing the temporary suspension of one, or more, car(s) from the roof supports when the jacks are retracted from the floor of the mineshaft so that the entire mobile train is temporarily suspended from the roof supports only to thus function to self-center the conveyor belt.

In accordance with yet another aspect of the invention, each of the plurality of cars in the mobile train is linked with adjacent cars of the train by linkages which allow the cars to pivot with respect to one another about two generally perpendicular axes, one axis generally parallel to the length of the mineshaft, the other generally parallel to the width of the shaft.

Preferably, each of the plurality of cars in the mobile train moves on wheels to which the hydraulic jack is affixed so that when the jacks are raised, the two jacks generally provided for each car are not subjected to undesirable imbalances from jack platforms that cannot roll——which might be the case when the jacks are supported by pads only.

The foregoing and other objects, features, aspects, and advantages of the invention will be apparent from the following more particular description of several preferred embodiments of the invention, as illustrated in the accompany drawings.

DETAILED DESCRIPTION

Figure 1:
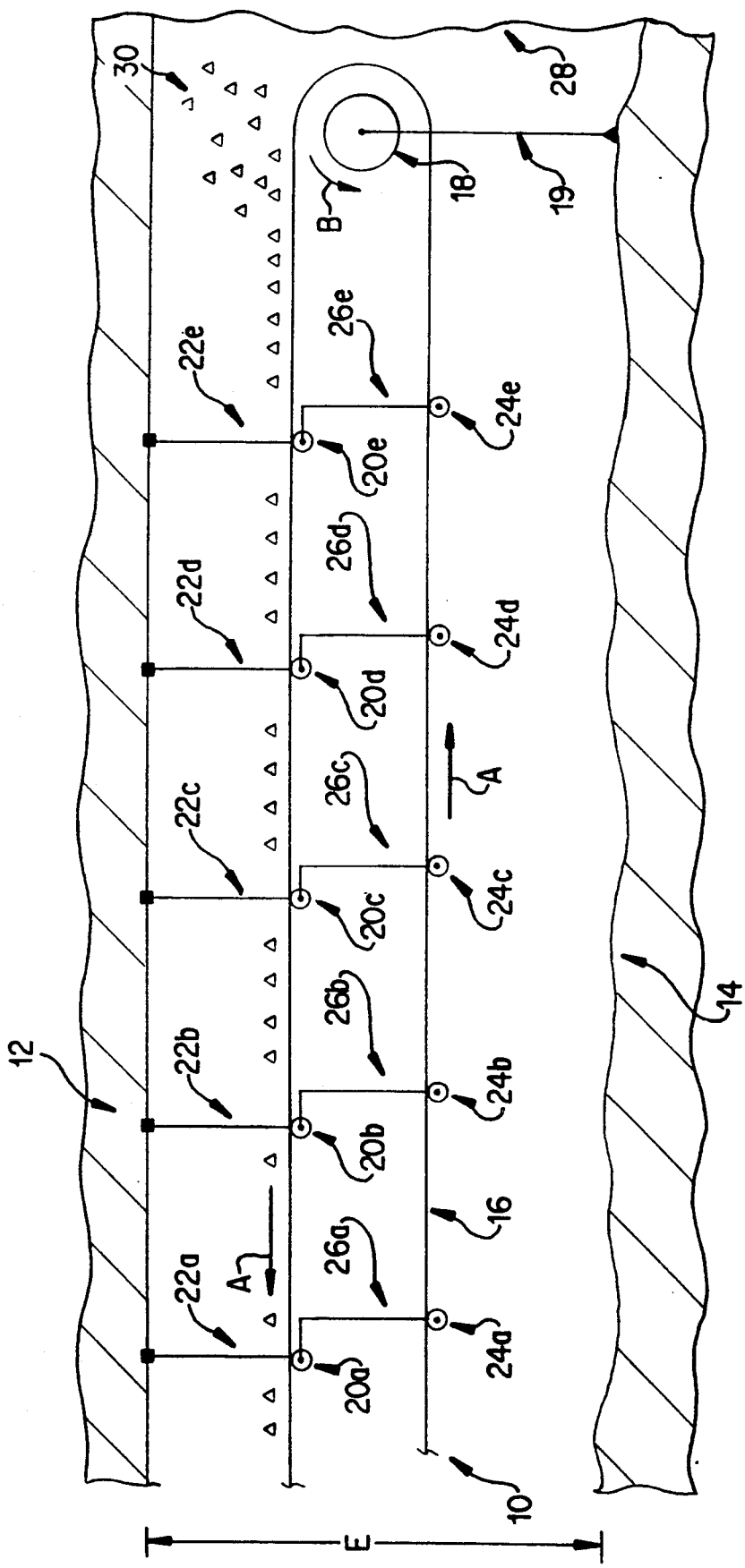
FIG. 1 is a schematic side view of a typical roof-supported conveyor system in an underground mineshaft.

With reference to FIG. 1, there is shown an underground mineshaft 10 which comprises both a roof 12 and a floor 14. Typically, both the roof 12 and floor 14 are uneven and thus the elevation E of the mineshaft is not uniform over the length of the shaft.

A conveyor belt 16 moves across a tail pulley 18 which is normally supported by a ground support 19 which may, or may not, have the same elevation as the top rollers 20a-e over which conveyor belt 16 runs. The top rollers 20a-e are suspended from supports 22a-e, all fixed to the roof 12 of the mineshaft. In similar fashion, lower, return, rollers 24a-e depend from suspension members 26a-e, also depending from the roof support means 22a-e.

In operation, a drive piece (not shown) to the left of FIG. 1 drives the conveyor belt to transport material removed from mine face 28 (by mining means not shown) which has removed material, indicated generally at 30.

As the mining means (not shown) continue to tear away at the face 28 of the mine, the mine face will recede from tail pulley 18 and pretty soon will become beyond the reach of the mining means to deposit material 30 on conveyor belt 16. At this point, the conveyor system has to be lengthened to again approach the mine face 28 to a reasonable and practical distance.

Figure 2:
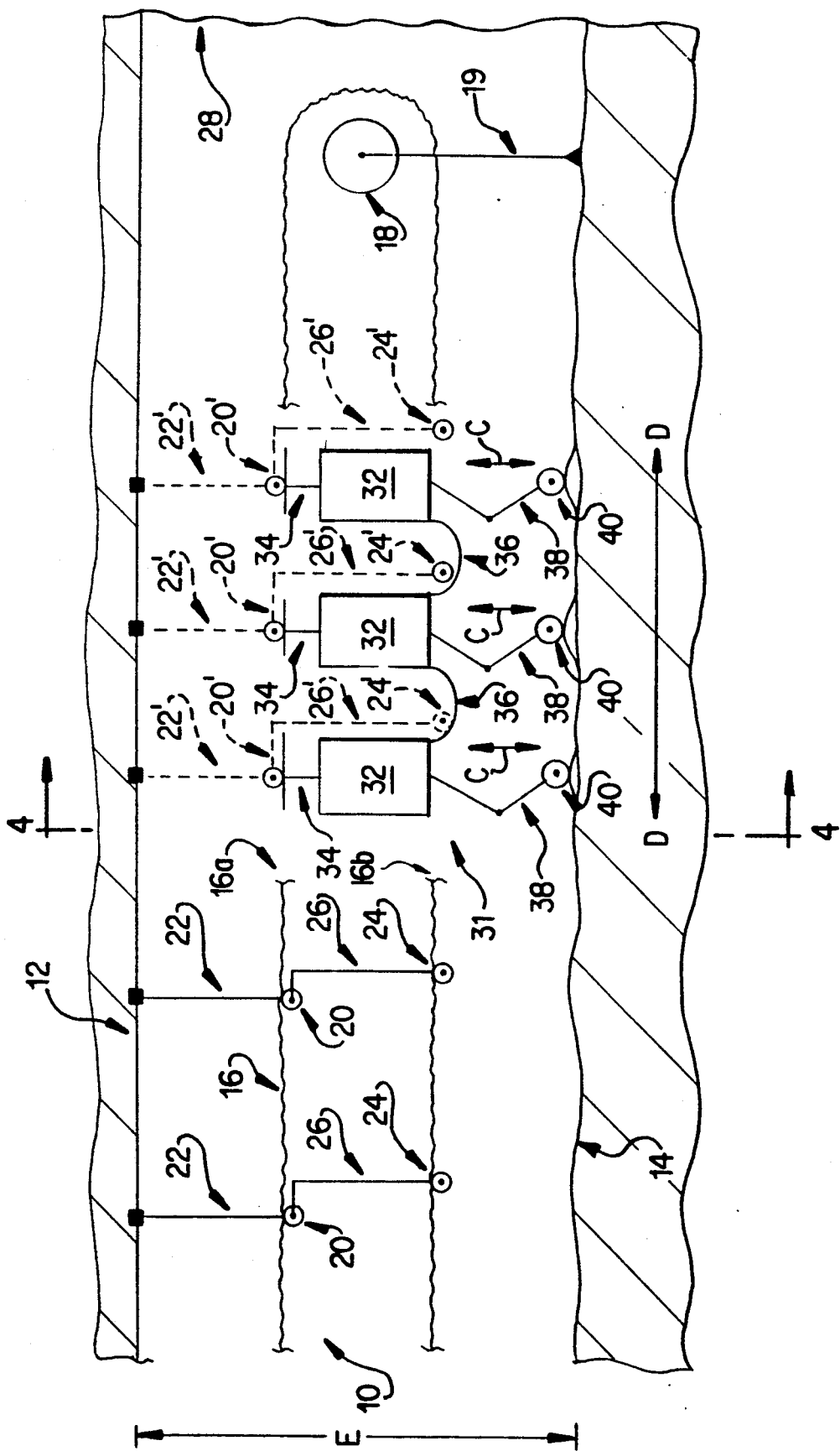
FIG. 2 is a schematic side view of a mobile and elevatable beltline moving system for extending the conveyor belt in a roof supported conveyor belt system in an underground mineshaft.

With reference to FIG. 2, where identical parts are numbered as in FIG. 1, a mobile train 31, comprised of a plurality of cars 32 has been put into position between the tail piece and the severed conveyor belt, severed at 16a and 16b. While FIG. 2 shows the belt 16 cut at two places, the top at 16a and the bottom at 16b (for clarity), it will be understood that, in a roof suspended conveyor system, only the bottom belt is typically cut.

Each carrier 32 has roller supports 34 supporting rollers 20' to become part of the newly extended conveyor belt system. Each car 32 is linked by link means 36 to the other and is also provided with jacks 38, indicated schematically, so that each of the cars 32 can be individually raised or lowered in the direction of the arrow C, or the entire train 31 can be lowered or raised in unison. FIG. 2 shows the mobile train already elevated so that the "new" rollers 20' already have the elevation necessary to support a new section of conveyor belt between the cut section 16a and 16b once the "new" roof supports 22' for suspending top rollers 20', and supports 26' for supporting return rollers 24' are in place. It is noted that raising, or elevating, rollers 20' by means of a jack eliminates the considerable manual effort to do so.

Preferably, each car 32 moves on wheels 40 to allow not only rapid movement of the mobile train to its desired destination, but also, as will be explained below, to prevent undesirable loads on the jacks 38 when the system is elevated.

Figure 3:
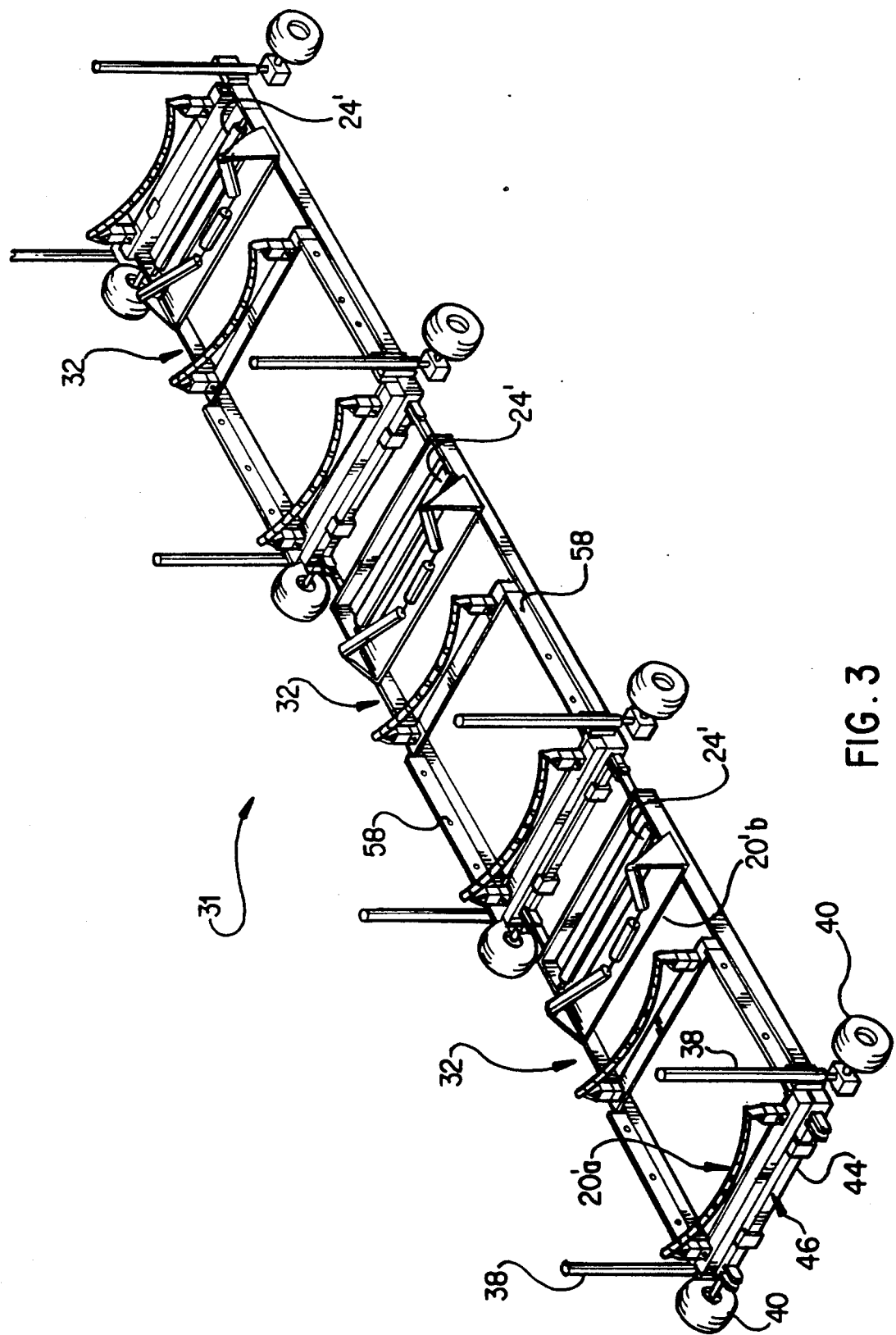
FIG. 3 is a perspective view of the essential components of a mobile carrier system according to the invention.

With reference to FIG. 3, the perspective view of a mobile train 31 generally is shown. A plurality of cars 32 each detachably carries at least one, preferably more, typical top roller structure 20'b to be suspended from the roof supports 22. While the detachable rollers 20'b are illustrated as being of the well-known "can" type, they may assume other shapes, such as the roller structure 20'a, which may desirably also be permanently provided on each car 32. While the permanently affixed roller structure 20'a is illustrated as preferably being of the type known in the trade as "Limber Roller" (believed to be a registered trademark of *The Joy Manufacturino Corp.*), they may equally well be of the can type shown for the detachable roller structure 20'b.

The roller structures 20'a are preferably permanently affixed to each car 32 so that, when mobile train 31 is elevated into position at the elevation shown of FIG. 2, the roller structure 20'a function as part of the conveyor system thereby leaving the permanent installation of the roller structure 20'b to the roof support 22' to a later, more opportune time.

Figure 4:
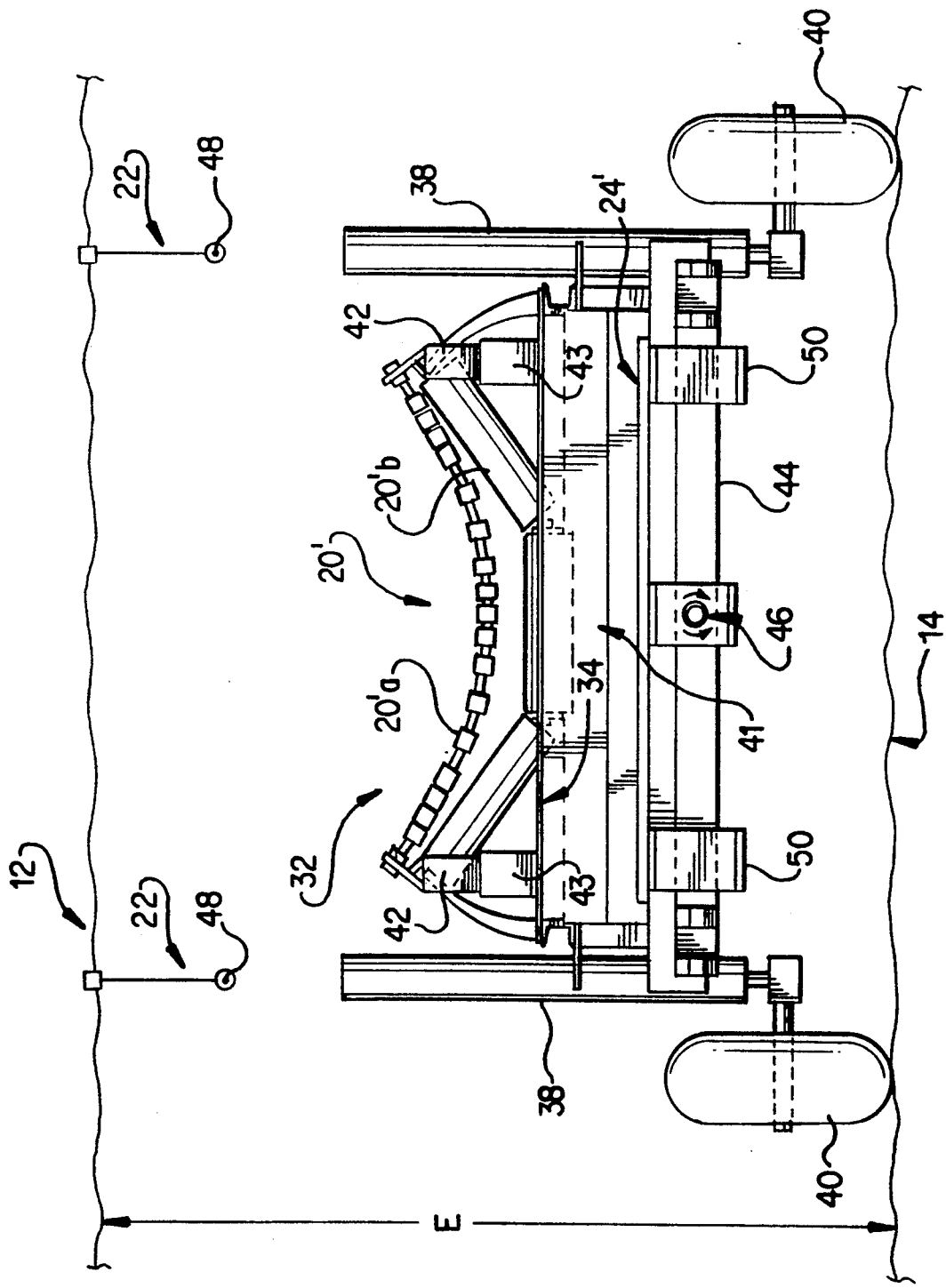
FIG. 4 is an end view of one of the cars making up the mobile and elevatable carrier system according to the invention; and, FIG. 5 is a partial perspective view showing details of the mechanism linking the plurality of cars in the mobile and elevatable carrier system according to the invention.

To allow for that situation, reference is made to FIG. 4 which shows the roller structures 20'b being mounted at a slightly lower elevation than the roller structures 20'a, to thereby allow the belt 16 to commence running on top rollers 20'a without obstruction by the roller structures 20'b.

Still, with reference to FIG. 3, each car 32 is equipped with tandem hydraulic jacks 38 on which are mounted wheels 40 and is also equipped with return rollers 24' so that the train can also provide return roller function for the belt 16.

As a reference to FIG. 3 will show, the plurality of cars 32 making up the mobile and elevatable train 31 are generally structurally identical except for the one car 32 that is at one of the ends of mobile train 31. This particular end car 32 may sometimes have four jacks and four wheels, although a two-wheeled form would work equally well. If the end car 32 indeed has four wheels 40, the outer wheels 40 may desireably mounted on a pivoting link bar 44 ( described below ) so that the wheels 40 can move to adapt to uneven terrain.

Each of the cars 32 in the mobile and elevatable train 31 is linked to an adjacent car by link means 36 generally which is comprised of a cross, or link, bar 44 (see also FIGS. 4 and 5) which is pivotably fixed to ca 32 by a pivot point 46 allowing link bar 44 to pivot about pivot point 46 in the direction of the arrows shown in FIG. 4. This pivoting movement allows each car 32 to remain generally level even though the floor 14 may have side-to-side variations in elevation.

With reference to FIG. 4, each car comprises a generally rigid frame 41 to house both the optional, and permanent, roller structure 20'a, as well as the roller structure 20'b which is detachably affixed ( by conventional means, not shown) to the frame 41 of car 32. The roller support 34 is comprised of a cross beam on which the permanent roller 20'a are optionally supported. Preferably an auxiliary jack 42, mounted on posts 43 (which are themselves affixed to roller support 34) is optionally used to support roller structure 20'a for additional flexibility in adjusting the elevation of the roller structure 20'a either uniformly, or independently, so that while roller structure 20'a becomes a support for the moving conveyor belt, the conveyor belt will properly be "trained" to ride centered in the top of the roller structure 20'a. The auxiliary jack 42 thus acts "in series" with jacks 38.

With reference further to FIG. 4, lateral support for the conveyor belt is provided, first of all, by roof supports 22 spaced across the width of the mineshaft which lateral support structure may be supplemented, if the roof supports 22 are of a chain (as opposed to a rigid frame) type, by additional lateral support means 48 which, independent of the nature of roof supports 22, may themselves either be rigid, or of the well-known wire-rope type. The particular choice of the nature of the support means is not critical to the operation of the system according to the invention, as it will work equally well with all possibilites, although for certain suspension supports there may be several advantageous features of the invention which may be utilized.

For example, if the roof supports 22 are of the chain type, elevation of the mobile train 31 on jacks 38 will allow chains 22 to hook into support holes 58 (see FIG. 3) (or other suitable attachment) provided in the sides of each car 32. Once the chains 22 have been hooked into the holes, or attachment points 58 of a car or several cars, the jacks 38 can be retracted to lift wheels 40 off the mine floor 14 and suspend mobile train 31 (temporarily) in "mid-air" so to speak. The natural self-centering action of the thusly suspended mobile train allows for better alignment of the top rollers 20, side-to-side. After such "self-centering" has been achieved, the jacks are again activated to place wheels 40 on floor 14 of the mineshaft so that, if desired at this point, the roller structures 20'b can be affixed to the roof supports 22 to provide, along with the elevated roller structure 20'a, the necessary roller support structure for a now-moving, and newly-extended, conveyor belt system.

Figure 5:
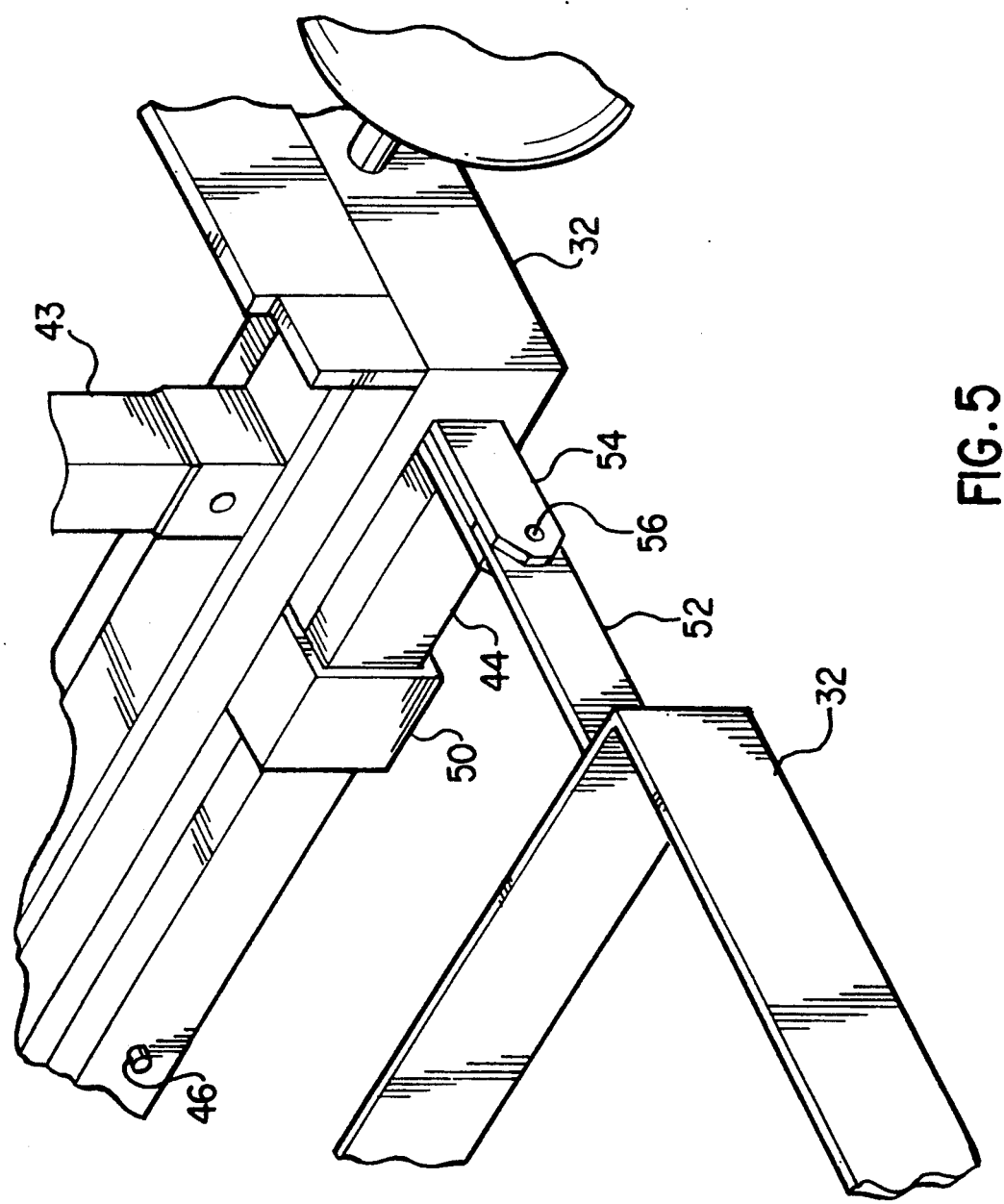

With reference to FIG. 5 (and also partially FIG. 4) each link bar 44 is restrained in its pivoting motion about pivot point 46 by bracket 50 firmly affixed, or welded, to each car 32. This limits the degree of rotation about pivot point 46 and hence rotation about pivot point 46 between the several cars 32. Brackets 50 also serve as a guard against excessive deflection of link bar 44 as the mobile train 31 is moved (by any suitable means, not shown) along the length of the mine shaft.

Also a part of the general link structure 36 is a clevis 54 allowing an extension beam of one car 32 to have pivoting freedom about pivot point 56 so that when two side extensions 52 (of which only one is shown in FIG. 5) mate with the corresponding clevis 54 (also two of which are provided, although only one is shown) to pivot about pivot points 56 thereby allowing each car 32 to assume, if so desired, a different elevation with respect to the adjacent car 32. Such might, for example, be desirable when the mine floor 14 is decidedly uneven in elevation.

The pair of jacks 38 provided on each car 32, and the pair of jacks 42 which may be optionally provided on each car 32, function, as previously described, to elevate cars 32 of the mobile train into and out of the elevation established by roof supports 22 for preexisting roller structures. Also, independent adjustment of jacks 28 and jacks 42, if so provided, allows lateral elevation adjustments to that a belt 16 is properly trained to run in the center of the trough of roller support structures 20'a and 20'b.

It should be noted that while wheels 40 are preferably provided on each car 32 to provide not only freedom for rapid mobility for the mobile and elevatable train 31, but also to guard against possibly assymetrical front-to-back loadings on the jacks 38 when extended, the invention is not so limited. Cars 32 may move along the floor 14 of a mineshaft suspended on tracks, or even on skids while still retaining the essential features of the invention.

It should also be noted that while the link means 36 have been illustrated as providing two degrees of kinematic freedom, other degrees of kinematic freedom may be added such as, for example, allowing clevis 54, shown as fixed to link bar 44, to have rotational freedom with respect thereto.

While the invention has been described using an illustration of an advancing conveyor system, the invention works equally well in reverse, so to speak, when the conveyor system is retreating. The only difference is that everything described will occur in reverse order.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A system for varying the length of a conveyor system in a mineshaft, the mineshaft having a length, a roof, and a floor, with the space between the roof and the floor defining the height of the mineshaft, comprising:
   a conveyor system suspended from the roof of the mineshaft, the conveyor system including rollers adapted to support a conveyor belt;
   carrier means movable along the length of the mineshaft, said carrier means including support means for detachably supporting thereon rollers;
   first means for varying the position of said support means along the height of the main shaft and adapted to move both toward and away from the roof; and
   suspension means for supporting rollers from the roof, said carrier means being movable into selected positions along the length of the mineshaft for both adding to, and subtracting rollers from, the suspension means to thereby vary the length of the conveyor system.

2. A system according to claim 1 wherein said carrier means includes a plurality of cars joined together by linking means allowing the cars to move along the length of the mineshaft in unison.

3. A system according to claim 2 wherein said linking means allows each car independently to pivot about axis that is generally parallel to the length of the mineshaft.

4. A system according to claim 3 wherein said linking means further allows each car independently to have a different height with respect to each other car.

5. A system according to claim 1 wherein said first means includes a first jack.

6. A system according to claim 5 wherein said first means includes a second jack, in series with the first jack.

7. A system according to claim 2 wherein the cars are supported on wheels.

8. A system according to claim 1 wherein the carrier means includes means for temporarily suspending the carrier means from the suspension means.

9. A system according to claim 1 wherein the support means carries rollers permanently affixed thereto so that the carrier means can temporarily function as part of the conveyor system.

10. Method for varying the length of a roof supported conveyor system in a mineshaft which has idlers to carry a conveyor belt, comprising:
    suspending the rollers for carrying a conveyor belt from the roof of the mineshaft;
    providing a movable carrier, movable along the length of the mineshaft;
    equipping the carrier with means for detachable supporting rollers;
    varying the heights of the carrier means so as to be able to both add and subtract rollers to and from the number of rollers desired for any given length of the conveyor belt.

11. Method according to claim 9 further including the step of mounting the carrier on wheels.

12. Method according to claim 11 wherein the carrier is formed by a plurality of separate cars.

13. Method according to claim 12 wherein the separate cars are joined by links allowing the cars to pivot about an axis generally parallel to the mineshaft.

14. Method according to claim 13 wherein the cars are linked so as to allow each car to have a different height with respect to another car.

15. Method according to claim 10 further including the step of permanently fixing rollers to the carrier allowing the carrier to temporarily become a part of the roof supported conveyor system.

* * * * *